(12) United States Patent
Langberg et al.

(10) Patent No.: US 6,310,896 B1
(45) Date of Patent: Oct. 30, 2001

(54) SYSTEM AND METHOD FOR DATA SEQUENCE CORRELATION IN THE TIME DOMAIN

(75) Inventors: Ehud Langberg, Wayside; Weimin Liu, Aberdeen; Xiao Liu, Ocean; William Scholtz, Middletown, all of NJ (US)

(73) Assignee: Globespan, Inc., Redbank, NJ (US)

( * ) Notice: Subject to any disclaimer, the term of this patent is extended or adjusted under 35 U.S.C. 154(b) by 0 days.

(21) Appl. No.: 09/174,026

(22) Filed: Oct. 16, 1998

Related U.S. Application Data

(60) Provisional application No. 60/085,299, filed on May 13, 1998.

(51) Int. Cl.[7] .................................................. H04J 3/06
(52) U.S. Cl. ................................................ 370/503; 370/516
(58) Field of Search .................................. 370/503, 504, 370/507, 508, 516, 517, 520

(56) References Cited

U.S. PATENT DOCUMENTS

| | | | |
|---|---|---|---|
| 4,652,069 | * 3/1987 | Smith | 439/369 |
| 5,883,929 | * 3/1999 | Wang et al. | 375/367 |
| 6,154,487 | * 11/2000 | Murai et al. | 375/150 |
| 6,212,223 | * 4/2001 | Okamoto | 375/150 |

* cited by examiner

*Primary Examiner*—David R. Vincent
(74) *Attorney, Agent, or Firm*—Thomas Kayden Horstemeyer & Risley

(57) ABSTRACT

A system and method are disclosed for synchronizing a predetermined repeated data sequence contained in a first data signal at a first sample rate with the same predetermined repeated data sequence contained in a second data signal at a second sample rate in a data communications device. The system preferably includes a digital signal processor operating pursuant to logic stored on a memory. The logic includes synchronization logic which reduces the first sample rate to a predetermined correlation sample rate using a first decimator, resulting in a first reduced data signal. The synchronization logic also reduces the second sample rate to the same predetermined correlation sample rate using a second decimator, resulting in a second reduced data signal. Finally, the synchronization logic determines a sequence offset between the predetermined repeated data sequence contained in the first reduced data signal and the predetermined repeated data sequence contained in the second reduced data signal using a correlator. This sequence offset is used to determine a time delay that is applied to the second data signal, thereby synchronizing the predetermined repeated data sequence contained in the first and second data sequences.

22 Claims, 3 Drawing Sheets

SYSTEM AND METHOD FOR DATA SEQUENCE CORRELATION IN THE TIME DOMAIN

CROSS REFERENCE TO RELATED APPLICATIONS

This application claims the benefit of United States provisional patent application entitled "Time-Domain Correlation Technique for Symbol Synchronization" filed on May 13, 1998 and afforded serial No. 60/085,299.

STATEMENT REGARDING FEDERALLY SPONSORED RESEARCH OR DEVELOPMENT

Not Applicable.

TECHNICAL FIELD

This invention relates to the field of data communications, and, more particularly, to the field of data signal correlation in the time domain.

BACKGROUND INFORMATION

In data communications, a data signal transmitted from a first modem to a second modem across a channel is often distorted due to the channel. In particular, the channel may cause intersymbol interference and other distortion. To remedy the distortion to a data signal due to the channel, it is often the case that an equalizer is employed in the receive circuitry of modems. In particular an equalizer may operate in the time domain or in the frequency domain.

Many equalizers that operate in the time domain employ digital signal processing techniques. Such time domain equalizers (TEQ's) may feature a digital filter with several coefficients which must be tuned to cancel the effects of a specific channel employed for data communication. The process of tuning these coefficients generally occurs at the startup of data communication.

To explain further, when TEQ training takes place, often times the transmitting modem sends a continuous data signal which comprises a predetermined data sequence that is repeated over and over. The same predetermined sequence is generated in the receiving modem, the sequence being repeated over and over in similar fashion to the signal received from the transmitting modem. The time domain equalizer generally employs various techniques to tune the coefficients of the digital filter applied to the received signal, thereby canceling the channel distortion so that the received signal matches the signal generated in the receiving modem.

In order to tune the coefficients, it is often the case that the received data signal and the generated data signal are first synchronized in time. When the predetermined sequence which is repeated in both the received and generated data signals is particularly long in nature, such as, for example, in discrete multitone (DMT) data communication, significant processing and memory resources are consumed to accomplish the required synchronization. Consequently, there is a need for a system and method of synchronizing a predetermined repeated data sequence contained in a received data signal and the same repeated data sequence contained in a generated data signal in a receiving modem where the predetermined data sequence is particularly long.

BRIEF SUMMARY OF THE INVENTION

The present invention involves a system for synchronizing a first data signal at a first sample rate with a second data signal at a second sample rate in a data communications device where the information relayed by both the first and second data signals comprises the same repeated predetermined data sequence. The system preferably includes a digital signal processor operating pursuant to logic stored on a memory. The logic includes synchronization logic which reduces the first sample rate to a predetermined correlation sample rate using a first decimator, resulting in a first reduced data signal. The synchronization logic also reduces the second sample rate to the same predetermined correlation sample rate using a second decimator, resulting in a second reduced data signal. Finally, the synchronization logic determines a sequence offset between the repeated sequence contained in the first reduced data signal and the same repeated sequence contained in the second reduced data signal using a correlator. This sequence offset is used to determine a time delay that is applied to the second data signal, thereby synchronizing the repeated sequences transmitted in the first and second data signals. Due to the reduced sample rates of the first and second reduced data signals, the sequence offset may be an approximation. The actual accuracy depends upon the predetermined correlation sample rate chosen for a particular application. The present invention provides a significant advantage in that the correlation functions require less memory and calculation time due to the reduction of the sample rates of the first and second data signals to the predetermined correlation sample rate. However, there exists a tradeoff between accuracy on one hand, and the reduction of memory and calculation time on the other. Generally, the inaccuracies generated can be corrected by the tuned time domain equalizer.

The present invention also comprises a method for synchronizing a predetermined data sequence that is repeated over and over in a first data signal at a first sample rate with the same repeated data sequence in a second data signal at a second sample rate in a data communications device. The method begins with the step of reducing the first sample rate of the first data signal to a predetermined correlation sample rate, thereby creating a first reduced data signal. Next, the second sample rate of the second data signal is reduced to the predetermined correlation sample rate, thereby creating a second reduced data signal. Finally, a sequence offset is determined between the repeated data sequences of the first reduced data signal and the second reduced data signal.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
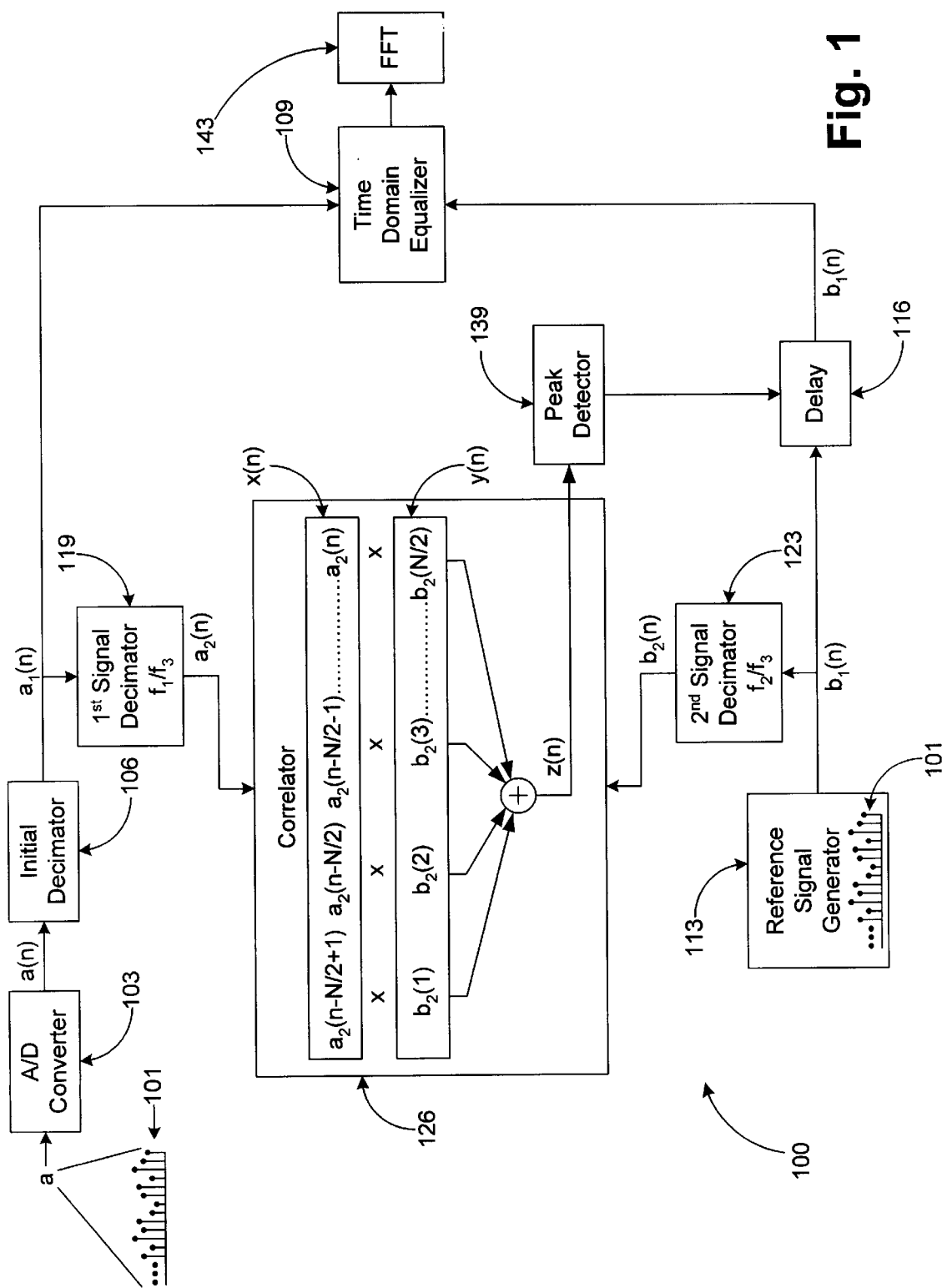
FIG. 1 is a functional block diagram of a correlation system according to the present invention.

Turning to FIG. 1, shown is a functional block diagram of a time domain correlator 100 performed in a modem (not shown) according to the preferred embodiment of the present invention. The time domain correlator 100 receives an analog data signal a which is received from a second modem (not shown) with which data communication is to be established. The analog data signal a contains a predetermined data sequence 101 which is repeated to create a continuous data stream employed during the startup phase of data communication. The analog data signal a may be transmitted, for example, from a modem which employs discrete multitone modulation techniques or other techniques known by those skilled in the art.

According to the present invention, the analog data signal a is provided to an analog-to-digital (A/D) converter 103 in the time domain, resulting in a data signal a(n) in digital form. The sample rate of the data signal a(n) is set by the A/D converter 103. The data signal a(n) then fed to an initial decimator 106 which transforms the data signal a(n) into a first data signal $a_1(n)$ having a first sample rate $f_1$ which is predetermined based on the desired sample rate employed by a time domain equalizer 109.

The first sample rate $f_1$ is the rate at which the time domain equalizer 109 operates upon incoming data to cancel the effects of intersymbol interference and other distortion caused by a channel (not shown) over which the analog data signal a is transmitted. During the startup period, the time domain correlator 100 is faced with the task of synchronizing a reference signal $b_1(n)$ generated by a reference signal generator 113 with the first data signal $a_1(n)$. The reference signal $b_1(n)$ is generated by the reference signal generator 113 using the same predetermined data sequence 101 as that contained in the analog data signal a and is repeated in a continuous data stream in the same fashion as the repeated data sequence of analog data signal a. To synchronize the predetermined data sequence 101 contained in the reference signal $b_1(n)$ with the same repeated data sequence contained in the first data signal $a_1(n)$, the reference signal $b_1(n)$ is subjected to a delay 116 in which the reference signal $b_1(n)$ is delayed by an amount of time which is determined as discussed in later text. After the first data signal $a_1(n)$ and the reference signal $b_1(n)$ are synchronized, the time domain equalizer 109 is tuned using the synchronized reference and first data signals $a_1(n)$ and $b_1(n)$.

To accomplish the synchronization of the data sequence contained in the first data signal $a_1(n)$ and the reference signal $b_1(n)$, according to the present invention, at the startup of data communication, a first signal decimator 119 operates on the first data signal $a_1(n)$ which reduces the first sample rate $f_1$, thereby creating a second data signal $a_2(n)$ with a predetermined correlation sample rate $f_3$. Also, a second signal decimator 123 operates on the reference signal $b_1(n)$ with a sample rate of $f_2$ to create a second reference signal $b_2(n)$ at the predetermined correlation sample rate $f_3$. Note that in the second data signal $a_2(n)$ and the second reference signal $b_2(n)$ the length of the predetermined repeated data sequence remains unchanged. Rather, the number of samples representing the repeated data sequence is reduced.

Next, the second data signal $a_2(n)$ and the second reference signal $b_2(n)$ are directed to a correlator 126 in which a first array x(n) comprising a predetermined number of samples N/2 is acquired from the second data signal $a_2(n)$ and a second array y(n) comprising having the same predetermined number of samples N/2 is acquired from the second reference signal $b_2(n)$. Note that a different number of samples may be used other than N/2 for the first and second arrays x(n) and y(n), depending on the decimation ratios $f_1/f_3$ and $f_2/f_3$ chosen. The first array x(n) is preferably a first-in-first-out array in which samples from the second data signal $a_2(n)$ are shifted in and the oldest value discarded during the synchronizing process. Thus the values in the first array x(n) are defined as a2(n−N/2+1), a2(n−N/2), a2(n−N/2−1) . . . a2(n) for specific values of n, where subsequent greater values of n cause the values in the first array x(n) to shift accordingly. The values held by the second array y(n) remain the same throughout the entire synchronization process and include $b_2(1), b_2(2), b_2(3), \ldots b_2(N/2)$. The number of samples N is equal to that necessary to represent the predetermined data sequence 101 which is continually repeated in the data signal a(n) and the reference signal b(n). The reduction of both the sample rates of both the first data signal $a_1(n)$ at $f_1$ and the reference signal $b_1(n)$ at $f_2$ to the correlation sample rate $f_3$ provides a distinct advantage in that the first and second arrays x(n) and y(n) do not require as much memory space as would the same arrays without sample rate reduction.

In the correlator 126, individual values for a third array z(n) are calculated using the data in the first and second arrays x(n) and y(n). The third array z(n) may also be called a peak detection array. Each value for the third array z(n) is calculated based on a particular set of values in the first array x(n). Next, a peak detector 139 determines which value in the third array z(n) is the greatest or peak value. The peak detector may accomplish this task by comparing the values in the third array z(n) to a predetermined threshold value which may be determined using an iterative process. The predetermined threshold may also be adapted over time. The position of the peak value in the third array z(n) indicates the starting point of the predetermined repeated data sequence contained in the second reference signal $b_2(n)$ relative to the starting point of the same sequence transmitted in the second data signal $a_2(n)$. From these starting points, a signal offset between the repeated sequences of the first data signal $a_1(n)$ and the reference signal $b_1(n)$ is determined. The delay 116 is then set so as to delay the reference signal $b_1(n)$ by a time period equal to the signal offset, thereby synchronizing the reference signal $b_1(n)$ with the first data signal $a_1(n)$. The time domain equalizer 109 is then tuned using the synchronized first data signal $a_1(n)$ and the delayed reference signal $b_1(n)$. Once the time domain equalizer 109 is tuned, the first data signal $a_1(n)$ undergoes a fast fourier transform (FFT) 143, such FFT's being known in the art and not discussed here in detail.

Note that the delay applied to the reference signal $b_1(n)$ may not accurately synchronize the occurrence of the predetermined data sequence 101 contained in the first data signal $a_1(n)$ with the same sequence contained in the reference signal $b_1(n)$. This is because the actual starting point of the sequence may not coincide with the position of the peak value in the third array z(n) due to the reduction of the sample rates of both the first data signal $a_1(n)$ at $f_1$ and the reference signal $b_1(n)$ at $f_2$ to the correlation sample rate $f_3$. However, even though the delay of the reference signal $b_1(n)$ may not be entirely accurate due to the reduction of the sample rates, such inaccuracy can be corrected by the time domain equalizer 109. Thus, a tradeoff exists between the desired accuracy of the delay versus the amount of time and memory used to accomplish the functions of the correlator 126.

Note in the particular application of a modem employing discrete multitone (DMT) data communication, the sequence which is repeated in the reference signal $b_1(n)$ at sample rate $f_2$ is generally represented every 512 samples. It is preferable that the sample rate $f_2$ be reduced by the second signal decimator 123 to the correlation sample rate $f_3$ in which the sequence is represented every 256 samples, for a sample rate reduction ratio $f_2/f_3$ of 2:1. The predetermined data sequence 101 may be represented every 512 samples, for example, and is reduced by the first signal decimator 119 to the correlation sample rate $f_3$ with a sample rate reduction ratio $f_1/f_3$ of 2:1. It is understood, however, that the sample rate reduction ratios $f_1/f_3$ and $f_1/f_3$ discussed above may be any ratio deemed appropriate depending upon where the tradeoff between the desired accuracy of the delay versus the amount of time and memory used to perform the functions of the correlator 126 is reconciled for a particular modem design. In addition, the predetermined data sequence 101 may be represented within a number of samples other than 512. Also note that the various functions and operations described in FIG. 1 may be performed sequentially or concurrently, depending on the particular hardware implementation.

Figure 2:
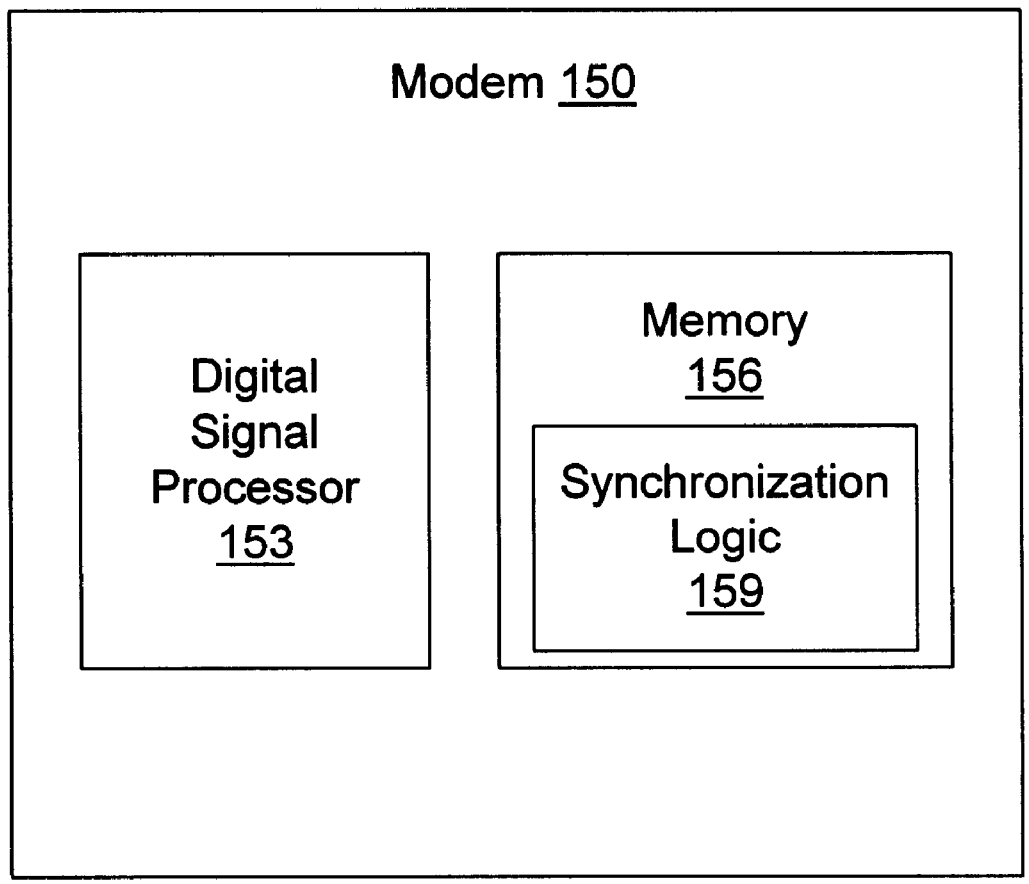
FIG. 2 is a block diagram of a modem according to the preferred embodiment of the present invention.

Referring to FIG. 2, shown is a block diagram of a modem 150 according to the preferred embodiment of the present invention. The modem 150 includes a digital signal processor 153 and a memory 156. Stored on the memory 156 is synchronization logic 159 which is executed by the digital signal processor 153 in synchronizing the first data signal $a_1(n)$ and the reference signal $b_1(n)$. The digital signal processor 153 and memory 156 may exist as separate integrated circuits or as a single integrated circuit such as a digital signal processor with on board memory. Also, both may exist as part of an application specific integrated circuit (ASIC).

In addition, it is possible that a logical circuit can be created using digital components other than a digital signal processor 153 in order to perform all of the functions to synchronize the first data signal $a_1(n)$ and the reference signal $b_1(n)$.

Figure 3:
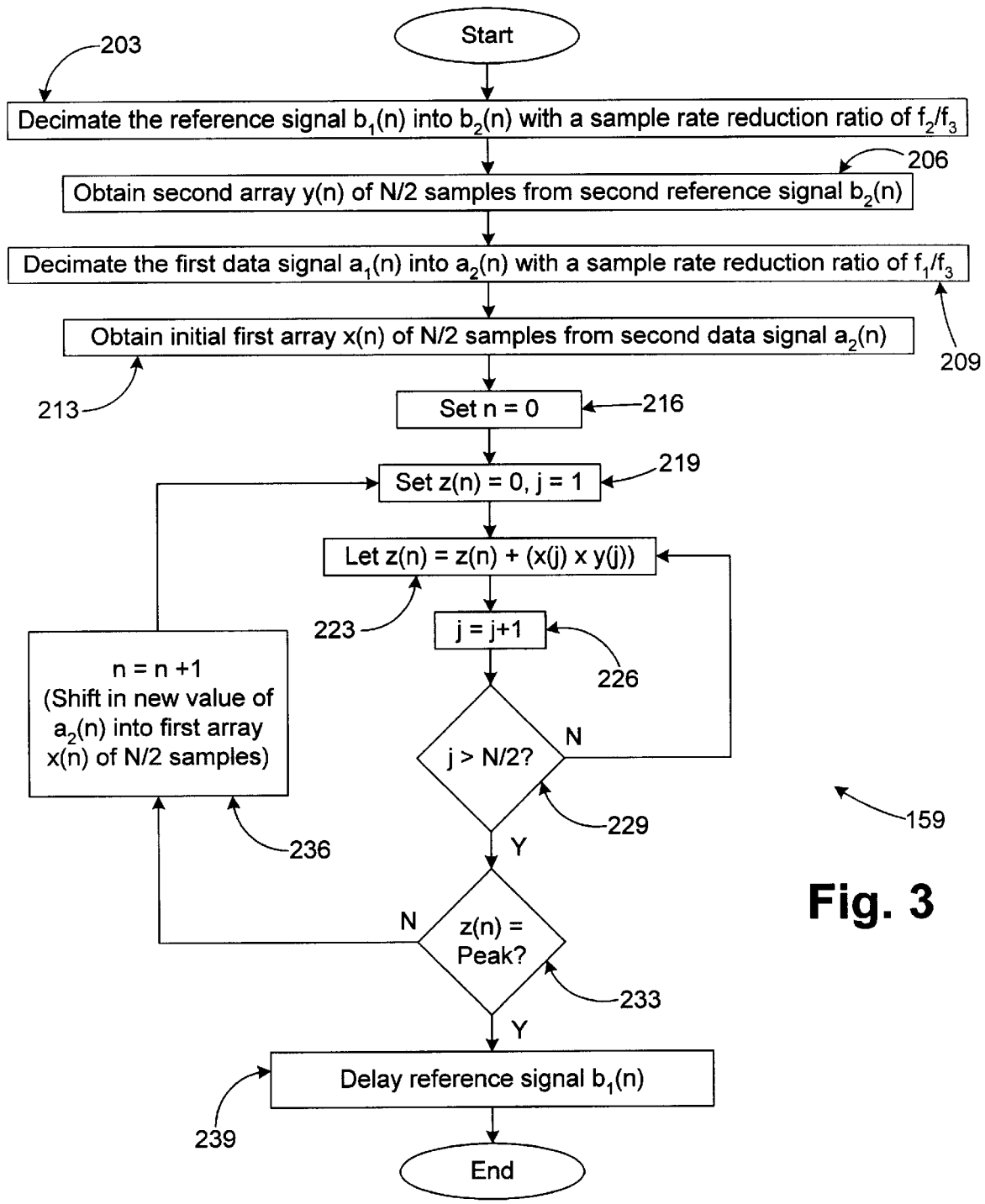
FIG. 3 is a flow chart of synchronization logic employed in the modem of FIG. 2.

Turning to FIG. 3, shown is a flow chart which illustrates the synchronization logic ("synch logic") 159 executed by the digital signal processor 153. Beginning with block 203, the synch logic 159 performs a decimation with a sample rate reduction ratio of $f_2/f_3$, in which the reference signal $b_1(n)$ at sample rate $f_2$ is transformed into the second reference signal $b_2(n)$ at the correlation sample rate $f_3$. Then, in block 206, the second array y(n) comprising N/2 samples is obtained from the second reference signal $b_2(n)$, where N is, once again, the number of samples needed at the sample rate $f_2$ to represent the full predetermined data sequence 101 (FIG. 1) repeated in the reference signal $b_1(n)$ which is generated in the modem 150 during the startup of data communication.

Thereafter, in block 209, a decimation is performed with a sample rate reduction ratio of $f_1/f_3$ in which the first data signal $a_1(n)$ at sample rate $f_1$ is transformed into the second data signal $a_2(n)$ at the correlation sample rate $f_3$. Then, in block 213, initial values are placed in the first array x(n) comprising N/2 samples from the second data signal $a_2(n)$, where N is the number of samples needed at the sample rate $f_1$ to represent a single predetermined data sequence 101 repeated in the first data signal $a_1(n)$ which is transmitted to the modem 150 (FIG. 2) during the startup of data communication.

Next, in block 216, the sample variable n is set equal to zero. In block 219, the $n^{th}$ value of z(n) is set equal to zero and a loop variable j is set equal to 1. Thereafter, in block 223, a calculation is performed according to the equation $$z(n)=z(n)+(x(j)\times y(j)).$$

Then, in block 226, the loop variable j is incremented by 1. In block 229, it is determined whether the loop variable j is greater than N/2, which would indicate that the last values of x(n) and y(n) have been applied to the equation of block 223. If the loop variable j is greater than N/2, then the synch logic 159 continues to block 233. If not, then the synch logic 159 reverts back to block 223 for another iteration of the loop. When the loop variable j is greater than N/2, then the value for z(n) is equal to the summation of the multiplication of corresponding pairs of the first array x(n) and the second array y(n).

Next, the synch logic 159 progresses to block 233 in which the value for z(n) is compared to a predetermined threshold peak value to determine whether the $n^{th}$ sample out of the N/2 samples taken represents the first sample of the predetermined data sequence 101 generated by the reference signal generator 113. In this manner, a sequence offset between the predetermined data sequence 101 contained in the data signal $a_1(n)$ and the same predetermined data sequence 101 contained in the reference signal $b_1(n)$ may be determined. If z(n) is not above the predetermined threshold peak value, then the synch logic 159 progresses to block 236. If not, then the synch logic 159 progresses to block 239. Note that block 233 takes advantage of the fact that a peak will occur in the calculations by which z(n) is determined above when the $n^{th}$ sample marks the beginning of the predetermined data sequence 101 contained in the second data signal $a_2(n)$.

In block 236, the sample variable n is incremented. When n is incremented, a new value from the second data signal $a_2(n)$ is shifted into the first array x(n). Then, the synch logic 159 reverts back to block 219 to perform the previous loop with the shifted values of the first array x(n).

Finally, in block 239, the reference signal $b_1(n)$ is restarted at the time n at the correlation sample rate $f_3$, which brings the predetermined data sequence 101 in the reference signal $b_1(n)$ into approximate synchronization with the predetermined data sequence 101 of the data signal $a_1(n)$. In another approach, the reference signal $b_1(n)$ is delayed by N−2n samples, since $b_1(n)$ operates the sample rate $f_2$ which, in the preferred embodiment, is twice the sample rate $f_3$, although a different ratio $f_2/f_3$ may be employed. This results in pausing the reference signal $b_1(n)$ which brings the predetermined data sequence 101 contained in the reference signal $b_1(n)$ into approximate synchronization with the predetermined data sequence 101 of the data signal $a_1(n)$ as well, thereby eliminating the need for the delay 116. The accuracy of the synchronization depends on the value chosen for N being mindful of the trade off between the desired accuracy of the delay versus the amount of time and memory used to perform the functions of the correlator 126 (FIG. 1) as discussed previously.

Note that the synch logic 159, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a memory.

Many variations and modifications may be made to the preferred embodiment of the invention without departing from the spirit and principles of the invention. All such modifications and variations are intended to be included herein within the scope of the present invention, as defined by the following claims.

Having thus described the invention, it is claimed:

1. An apparatus for synchronizing a predetermined repeated data sequence contained in a first data signal at a first sample rate with the same predetermined repeated data sequence contained in a second data signal at a second sample rate in a data communications device, comprising:
   a processor;
   a memory;
   synchronization logic stored on the memory, the processor operating according to the synchronization logic, the synchronization logic comprising:
      logic to reduce the first sample rate of the first data signal to a predetermined correlation sample rate, thereby creating a first reduced data signal;
      logic to reduce the second sample rate of the second data signal to the predetermined correlation sample rate, thereby creating a second reduced data signal; and
      logic to determine a sequence offset between the predetermined repeated data sequence contained in the first reduced data signal and the predetermined repeated data sequence contained in the second reduced data signal.

2. The apparatus of claim 1, wherein the synchronization logic further comprises logic to delay the second data signal by a time period equal to the sequence offset.

3. The apparatus of claim 1, wherein the synchronization logic further comprises logic to pause the second data signal by a time period equal to the sequence offset.

4. The apparatus of claim 1, wherein the logic to determine a sequence offset further comprises:
   logic to acquire a receive array from the first reduced data signal;
   logic to acquire a second array from the second reduced data signal;
   logic to calculate a peak detection array from the receive array and the second array; and
   logic to determine the sequence offset by locating a peak value in the peak detection array.

5. The apparatus of claim 4, wherein the logic to calculate a peak detection array further comprises logic to calculate each value of the peak detection array by totaling the results of a multiplication of corresponding values from the first array and the second array.

6. The apparatus of claim 1, wherein a reduction ratio between the second sample rate and the predetermined correlation sample rate is 2:1.

7. The apparatus of claim 1, wherein a reduction ratio between the first sample rate and the predetermined correlation sample rate is 2:1.

8. An apparatus for synchronizing a predetermined repeated data sequence contained in a first data signal at a first sample rate with the same predetermined repeated data sequence contained in a second data signal at a second sample rate in a data communications device, comprising:
   a first logical circuit configured to reduce the first sample rate of the first data signal to a predetermined correlation sample rate, thereby creating a first reduced data signal;
   a second logical circuit logic configured to reduce the second sample rate of the second data signal to the predetermined correlation sample rate, thereby creating a second reduced data signal; and
   a third logical circuit logic configured to determine a sequence offset between the predetermined repeated data sequence contained in the first reduced data signal and the predetermined repeated data sequence contained in the second reduced data signal.

9. An apparatus for synchronizing a predetermined repeated data sequence contained in a first data signal at a first sample rate with the same predetermined repeated data sequence contained in a second data signal at a second sample rate in a data communications device, comprising:
   means for reducing the first sample rate of the first data signal to a predetermined correlation sample rate, thereby creating a first reduced data signal;
   means for reducing the second sample rate of the second data signal to the predetermined correlation sample rate, thereby creating a second reduced data signal; and
   means for determining a sequence offset between the predetermined repeated data sequence contained in the first reduced data signal and the predetermined repeated data sequence contained in the second reduced data signal.

10. The apparatus of claim 9, further comprising means for delaying the second data signal by a time period equal to the sequence offset.

11. The apparatus of claim 9, further comprising means for pausing the second data signal by a time period equal to the sequence offset.

12. The apparatus of claim 9, wherein means for determining a sequence offset further comprises:
   means for acquiring a receive array from the first reduced data signal;
   means for acquiring a second array from the second reduced data signal;
   means for calculating a peak detection array from the receive array and the second array; and
   means for determining the sequence offset by locating a peak value in the peak detection array.

13. The apparatus of claim 12, wherein the means for calculating a peak detection array further comprises means for calculating each value of the peak detection array by totaling the results of a multiplication of corresponding values from the first array and the second array.

14. The apparatus of claim 9, wherein a reduction ratio between the second sample rate and the predetermined correlation sample rate is 2:1.

15. The apparatus of claim 9, wherein a reduction ratio between the first sample rate and the predetermined correlation sample rate is 2:1.

16. A method for synchronizing a predetermined repeated data sequence contained in a first data signal at a first sample rate with the same predetermined repeated data sequence contained in a second data signal at a second sample rate in a data communications device, comprising the steps of:

reducing the first sample rate of the first data signal to a predetermined correlation sample rate, thereby creating a first reduced data signal;

reducing the second sample rate of the second data signal to the predetermined correlation sample rate, thereby creating a second reduced data signal; and determining a sequence offset between the predetermined repeated data sequence contained in the first reduced data signal and the predetermined repeated data sequence contained in the second reduced data signal.

17. The method of claim 16, further comprising the step of delaying the second data signal by a time period equal to the sequence offset.

18. The method of claim 16, further comprising the step of pausing the second data signal by a time period equal to the sequence offset.

19. The method of claim 16, wherein the step of determining a sequence offset further comprises the steps of:

acquiring a receive array from the first reduced data signal;

acquiring a second array from the second reduced data signal;

calculating a peak detection array from the receive array and the second array; and determining the sequence offset by locating a peak value in the peak detection array.

20. The method of claim 19, wherein the step of calculating a peak detection array further comprises the step of calculating each value of the peak detection array by totaling the results of a multiplication of corresponding values from the first array and the second array.

21. The method of claim 16, wherein the step of reducing the second sample rate further comprises reducing the second sample rate by a reduction ratio between the second sample rate and the predetermined correlation sample rate of 2:1.

22. The method of claim 16, wherein the step of reducing the first sample rate further comprises reducing the first sample rate by a reduction ratio between the first sample rate and the predetermined correlation sample rate of 2:1.

* * * * *